(12) United States Patent
Seekins et al.

(10) Patent No.: US 8,954,689 B2
(45) Date of Patent: Feb. 10, 2015

(54) LIMITING ACTIVITY RATES THAT IMPACT LIFE OF A DATA STORAGE MEDIA

(75) Inventors: David Scott Seekins, Shakopee, MN (US); Ryan James Goss, Prior Lake, MN (US); Kristofer Carlson Conklin, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 308 days.

(21) Appl. No.: 13/173,935

(22) Filed: Jun. 30, 2011

(65) Prior Publication Data

US 2013/0007380 A1    Jan. 3, 2013

(51) Int. Cl.
*G06F 13/00* (2006.01)
*G06F 13/28* (2006.01)
*G06F 3/06* (2006.01)
*G06F 12/02* (2006.01)

(52) U.S. Cl.
CPC ............ *G06F 3/0616* (2013.01); *G06F 3/0659* (2013.01); *G06F 3/0679* (2013.01); *G06F 12/0246* (2013.01); *G06F 2212/1036* (2013.01)
USPC ....................................................... 711/154

(58) Field of Classification Search
CPC ............... G06F 12/0246; G06F 2212/7211; G06F 2212/7208; G06F 2212/1036; G06F 3/0616; G06F 3/0679; G11C 16/349
See application file for complete search history.

(56) References Cited

U.S. PATENT DOCUMENTS

| | | | |
|---|---|---|---|
| 7,747,813 B2 | 6/2010 | Danilak | |
| 8,190,804 B1 * | 5/2012 | Srinivasan et al. | 710/244 |
| 2008/0126720 A1 * | 5/2008 | Danilak | 711/158 |
| 2011/0002224 A1 * | 1/2011 | Tamura | 370/236 |
| 2011/0016239 A1 * | 1/2011 | Stenfort | 710/34 |
| 2011/0099320 A1 * | 4/2011 | Lucas et al. | 711/103 |
| 2011/0202780 A1 * | 8/2011 | Ko | 713/320 |

* cited by examiner

*Primary Examiner* — Idriss N Alrobaye
*Assistant Examiner* — Ronald Modo
(74) *Attorney, Agent, or Firm* — Hollingsworth Davis, LLC

(57) ABSTRACT

A first cumulative data transfer over a first time window from an intermediary module to a data storage media is determined. The intermediary module is coupled between a host interface and the data storage media. An activity rate from the intermediary module to the data storage media is limited for one or more subsequent time windows if the first cumulative activity rate exceeds a threshold value that impacts life of the data storage media. The limitation of the activity rate is removed after the one or more subsequent time windows expire.

14 Claims, 7 Drawing Sheets

US 8,954,689 B2

LIMITING ACTIVITY RATES THAT IMPACT LIFE OF A DATA STORAGE MEDIA

SUMMARY

The present disclosure is related to systems and methods for controlling activity of a storage media for purposes such as extending the life of the media. For example, in one embodiment, a method involves determining a first cumulative rate of an activity over a first time window between an intermediary module and a data storage media. The intermediary module is coupled between a host interface and the data storage media. A subsequent rate of the activity between the intermediary module and the data storage media are limited for one or more subsequent time windows if the first cumulative rate exceeds a threshold value that impacts life of the data storage media. The limitation of the subsequent rate is removed after the one or more subsequent time windows expire.

In another embodiment, an apparatus includes an intermediary module coupled between a host interface and a data storage media. The apparatus includes at least one controller that causes the apparatus to determine a cumulative rate of an activity between the intermediary module and the data storage media over a first time window. The controller causes the apparatus to limit a subsequent rate of the activity between the intermediary module and the data storage media for one or more subsequent time windows if the cumulative rate exceeds a threshold value that impacts life of the data storage media. The controller also causes the apparatus to remove the limitation of the subsequent rate after the one or more subsequent time windows expire.

In another embodiment, an apparatus includes an intermediary module coupled between a host interface and a data storage media. The apparatus includes at least one controller that causes the apparatus to define a first time window during which activities between the intermediary module and the data storage media are not throttled. The controller causes the apparatus to define subsequent time windows during which activities between the intermediary module and the data storage media are throttled if a cumulative amount of activity of the first time window and preceding ones of the subsequent time windows exceeds a threshold value. The controller causes the apparatus to determine activity metrics of a first window count that comprises the first and subsequent time windows. Thresholds of subsequent window counts are adjusted based on the first activity metrics.

BRIEF DESCRIPTION OF THE DRAWINGS

In the following diagrams, the same reference numbers may be used to identify similar/same components in multiple figures.

DETAILED DESCRIPTION

Figure 1A:
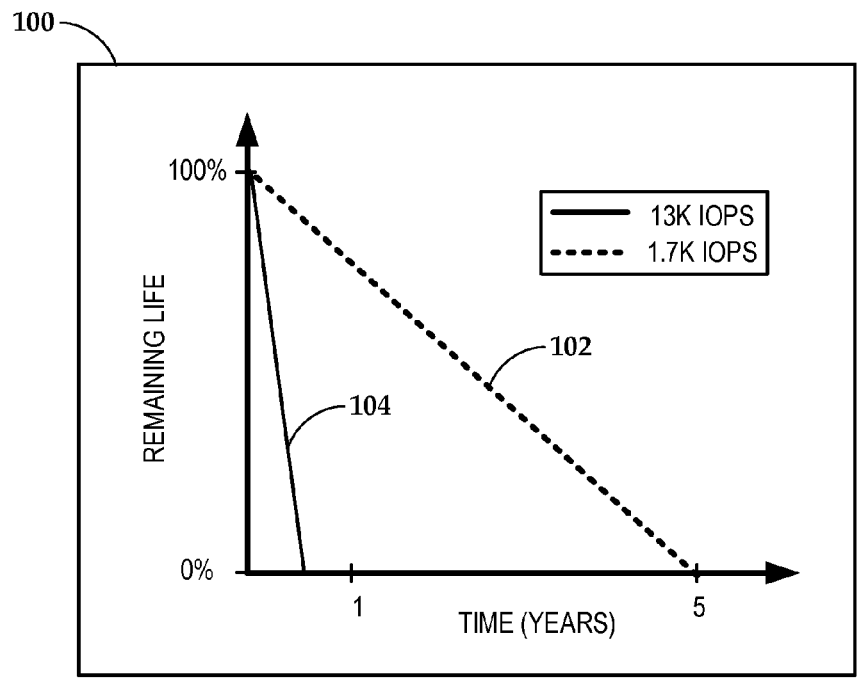
FIG. 1A is a graph illustrating predicted life versus programming rate for devices according to example embodiments.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the present invention.

The present disclosure is generally related to systems and methods that facilitate extending the life of data storage media. For example, data access activities affecting a media can be throttled in such a way that the media can achieve a desired endurance level. This can help ensure the media operates reliably for a specific period of time (e.g., warranty period). The throttling can be applied to take into account factors such as break-in periods, current state of wear, and recent usage patterns so as to minimize the effects of the throttling seen by the end user (e.g., in the form of reduced host data transfer speeds).

In the discussion that follows, the data storage media may be described as being solid-state, non-volatile memory, such as flash memory. Flash memory is known to have a limit on the number of program/erase (PE) cycles that the memory cells can undergo before being worn out, e.g., when the cells can no longer reliably store data. It has also been found a sustained period of activity (e.g., high data transfer rates for reading, writing, and/or erasing the media) can accelerate this degradation of the media, in which case it may be desirable to reduce data transfer rate during activities such as reads, writes, and erasures.

While the discussion that follows may refer largely to solid-state, non-volatile media, other types of media such as disks of hard disk drives (HDDs) may also benefit from the write throttling features described herein. Accordingly, the embodiments described herein may be equally applicable to those types of media. For example, a drive technology known as heat assisted magnetic recording (HAMR) uses hard disks as a data storage media. In conventional hard disk drives, the areal density is limited by what is known as the superparamagnetic effect, in which the bits stored in the media become unstable as the region storing the bits shrinks to a particular size. A HAMR drive has a special media that allows the bits to be much smaller than in a conventional hard drive, yet still remain stable at room temperature. However, in order to record this media, it must be heated (e.g., via a laser) while a magnetic field is applied to reduce the coercivity of the media at the spot the data is being recorded. Similar to, e.g., flash memory, it has been determined that in some scenarios, the life of a HAMR HDD may be reduced by high levels of write throughput.

Another HDD technology known variously as shingled magnetic recording (SMR), high track density recording (HTDR), and/or banded recording may also benefit from the write throttling discussed herein. An SMR device may use conventional or HAMR recording technology for data storage, and uses a different arrangement of tracks than what is used in most conventional HDDs. Instead of writing tracks as separate concentric circles which are each divided into sectors, an SMR devices layers, or "shingles," a set of tracks one over the other. These overlaid tracks (referred to herein as a "super sector" or "vast sector") may include hundreds or thousands overlapping, concentric portion. Gaps are created between vast sectors so that each vast sector can be updated independently of other vast sectors.

By using overlapping concentric portions, an SMR write head can be adapted to generate high local fields without consideration of adjacent track erasure. As a result of these high fields, the data patterns may have more uniform vertical magnetic fields and can penetrate deeper into the medium. This allows a shingled-writing scheme to substantially increase data density compared to convention track writing schemes, even when using conventional (e.g., non-HAMR) magnetic media.

A side effect of the SMR writing scheme is that individual parts of the vast sectors may not be randomly updated on their own. The tracks are written in sequential concentric bands, and portions cannot be updated without recovering/rewriting portions of subsequently written data. This may mean that a host request to write n-bytes of data may result in substantially more than n-bytes being written to the media. This is analogous to what is referred to in the field of solid state, non-volatile memory as "write amplification." Therefore, the discussion hereinbelow related to write amplification in solid-state memory may be equally applicable to HDD devices using an SMR writing scheme.

In reference now to FIG. 1A, a graph 100 illustrates an example of how throttling write activity can extend the life of a drive according to embodiments described herein. The performance shown in FIG. 1A assumes the media being written to is a multi-level cell (MLC) flash memory solid-state drive (SSD) of 200 GB capacity. Data is random written in 4 kB blocks at two constant data rates, 13 k input/output operations per second (IOPS) (shown by curve 104) and 1.7 k IOPS (shown by curve 102). For purposes of simplification, the estimate of usable life (the vertical axis) is based on PE cycles alone, 5000 cycles for this example. While curves 102, 104 represent different constant rates for random write events, the total amount written in both cases over an equivalent period of time would be the same (e.g., there would be idle times such that data being written to the media in case 102 could catch up with that of case 104).

As FIG. 1A is intended to illustrate, the life of the media can be significantly less if it is written to at the 13K IOPS rate instead of the 1.7K IOPS rate. An analogous result (although possibly with different magnitudes) may be seen for other types of media, such as HAMR media. It should also be noted that the results of this example are based on IOPS written to the media, and not necessary written by the host. Due to factors such as compressions and write amplification, there may be a significant difference between host data rates and data rates written to the media via an intermediary, e.g., a flash controller that mediates data transferred between the host interface and the media.

Write amplification in solid-state non-volatile memory arises, at least in part, due to the way such media is written to, or "programmed." In a conventional HDD media, the smallest unit of data (e.g., sector) may be arbitrarily overwritten by changing a magnetic polarity of a write head as it passes over the media. In contrast, solid state memory cells are first erased by applying a relatively high voltage to the cells before being programmed. For a number of reasons, these erasures are performed on blocks of data (also referred to herein as "erase units") that are larger than the smallest programmable unit (e.g., page). In such a case, when data of an existing page needs to be changed, it may be inefficient to erase and rewrite the entire block in which the page resides, because other data within the block may not have changed. Instead, it may be more efficient to write the changes to an empty page in a new physical location, remap a logical to physical mapping by which the page is accessed, and mark the old physical locations as invalid/stale.

After some time, a number of data storage units within a block may be marked as stale due to changes in data stored within the block. As a result, it may make sense to move any valid data out of the block to a new location, erase the block, and thereby make the block freshly available for programming. This process of tracking invalid/stale data units, moving of valid data units from an old block to a new block, and erasing the old block is sometimes collectively referred to as "garbage collection." Garbage collection may be triggered by any number of events. For example, metrics (e.g., a count of stale units within a block) may be examined at regular intervals and garbage collection may be performed for any blocks for which the metrics exceed some threshold.

Operations such as garbage collection may cause a single write request to cause more than one write operation to be performed by the controller. This is one example of write amplification that occurs in a solid-state, non-volatile device. Many factors may affect write amplification, including whether writes from host are sequential/random, wear leveling, garbage collection, the amount of free data storage space, etc. As described above, other types of media, such as SMD drives, may also exhibit write amplification.

Due to write amplification, it may be useful to differentiate between host data transfer rates and media data transfer rates when considering the effect of sustained IOPS on media wear as shown in FIG. 1A. In the case of write amplification, the host data transfer rate may be smaller than the media data transfer rate. Some features of a device may cause the opposite effect, that is to reduce the amount of data being written to the media as compared to what is received at the host interface. For example, host data may be compressed before being stored in the non-volatile media, thus lowering the effective data transfer rate to the media as compared to the host interface. In another example, a volatile cache may be used to buffer data before it is written to the non-volatile media. In such a case, if a portion of memory is being quickly rewritten, such changes can take place in the cache before being committed to the non-volatile media. In such a case, there may be a reduction in data rate seen by the media compared to the host interface. A similar effect may be seen for different types of writes, e.g., random versus sequential, large versus small requests, current or historical nature of the access (e.g., whether certain blocks of data are being continually accessed/changed).

The results of FIG. 1A may also be analogous to other types of activity affecting a media, such as reading and erasure. Non-volatile solid-state storage such as flash memory (which includes both NAND and NOR flash memory), stores data in cells similar to a metal-oxide semiconductor (MOS) field-effect transistor (FET), e.g., having a gate (control gate), a drain, and a source. The drain and the source are connected by the channel. In addition, the memory cell includes what is known as a "floating gate." When a selected voltage is applied to the control gate, differing values of current may flow through the channel depending on the value of the threshold voltage. This current flow can be used to characterize two or more states of the cell that represent data stored in the cell.

While the voltages applied to the control gate during reading of a flash cell are not as high as those applied when programming the cells, a high rate of read activity could still affect life expectancy of the media. Similarly, erasures involve applying a relatively high reverse voltage to the cells, and this could also affect life expectancy of the cells if done at a high rate. It is to be understood, therefore, that while the particular examples below may discuss write throttling, limiting data transfer rates to a media, etc., this may apply equally to any activity rate exceeding a threshold value that impacts life of the data storage media. These activities may be considered separately, or in any combination. For example, data activity could be considered a combination of reads, writes, and/or erasures, and each contributor could be weighted based on relative amount of impact each activity is predicted to have on life of the media.

These other data access activities (reads, erasures) may also exhibit differences between host and media data transfer rates under some conditions. For example, a read amplification may occur where less than a page of memory is requested by the host. In such a case, the memory device may still need to read the entire page from the media, and then discard any excess data when fulfilling the request. Other factors such as data compression, random versus sequential, large versus small requests, current or historical nature of the access (e.g., whether certain blocks of data are being continually accessed/changed) that was described above regarding programming, may have an analogous affect on reads and/or erasures.

Figure 1B:
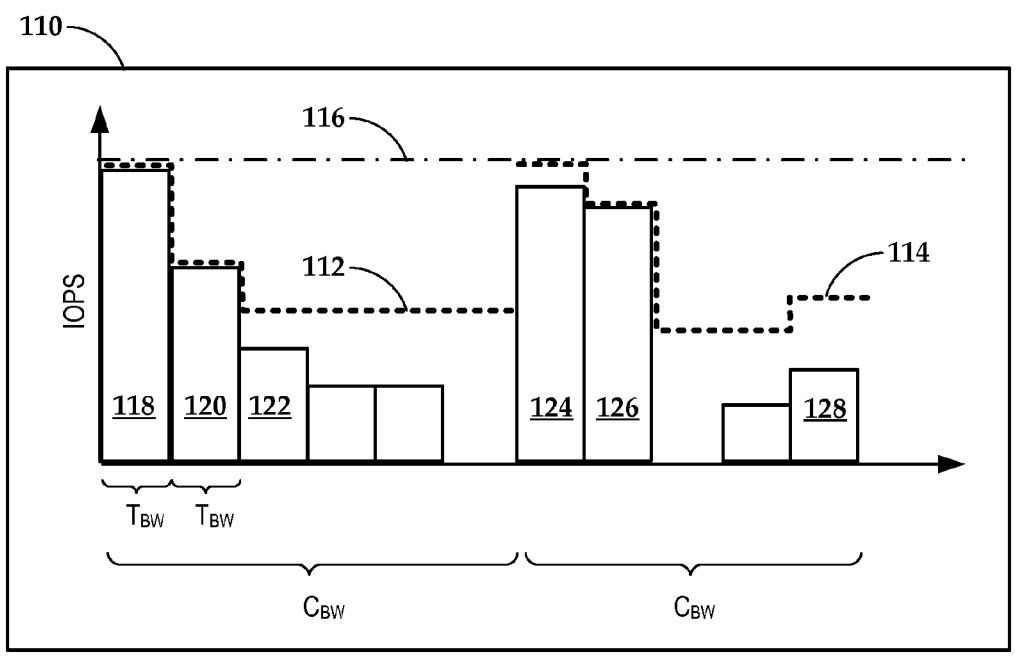
FIG. 1B is a graph illustrating burst windows used in throttling program activity according to an example embodiment.

In reference now to FIG. 1B, a graph 110 illustrates one aspect of limiting media activity according to an example embodiment. Generally, an intermediary module (e.g., memory controller) analyzes media write traffic in terms of time windows. As seen in FIG. 1B, $T_{BW}$ represents a burst window period, during which a host write data rate will be allowed to remain constant up to some set limit. The actual amount of host-initiated media write traffic may be counted during this period. For purposes of simplification, the $T_{BW}$ are all shown as exhibiting a constant data transfer rate during the period. This may occur in some cases (e.g., large sequential data transfer). In other cases these blocks may be considered as envelopes showing an average or ceiling value.

Also seen in FIG. 1B is burst window count, $C_{BW}$, which refers to a number of $T_{BW}$ to which a common set of metrics apply. At the end of each $C_{BW}$, the metrics can be reset and/or recalculated based on historical averages, current state of wear, etc. The value of $C_{BW}$ and time value for each $T_{BW}$ may set based on a target host environment (e.g., enterprise server, personal computer, mobile device, etc.) For purposes of illustration and not limitation, the $T_{BW}$ may be a fixed value on the order of 10 minutes. As will be discussed further below, $T_{BW}$ may be dynamically varied to optimize performance. The $C_{BW}$ could be on the order of 10, and could be dynamically adjustable using similar criteria as $T_{BW}$.

At the end of each $T_{BW}$, the allowable media data transfer may be recalculated, and used to throttle writes (or other activity) to the media during that time. The throttling is shown as dashed lines 112, 114 in the two illustrated $C_{BW}$ periods. Line 116 represents a system-dependent, maximum, data transfer rate to the media, e.g., the amount that would be possible to write without any explicit throttling of the write data. In burst window 118, there is no throttling, and the data is allowed to be written at the maximum rate for this window 118. During the next $T_{BW}$ window 120, the maximum write transfer rate is throttled based on the activity in the previous window 118, and again this maximum amount is used. During $T_{BW}$ window 122, the maximum write transfer rate is throttled further based on the activity in window 120 (and in some cases window 118). The activity during and after window 122 does not exceed some threshold value, and so the maximum write limit is not throttled further during the first $C_{BW}$.

During the second $C_{BW}$, the throttling is removed and the writes are allowed the theoretical maximum data transfer rate 116, although in this example, the maximum rate is not fully utilized during $T_{BW}$ window 124. This allows for less throttling during the next window 126 as compared to window 120. As seen at window 128, the throttling restrictions of profile 114 may be relaxed, e.g., based on previous light activity between windows 126 and 128. As will be discussed further below, the throttling profiles 112, 114 may also be adjusted based on current wear, system age, and long-term write history. Another variable, $T_{LL}$ (not shown), can be used to represent an amount of time that elapses between recalculation of long-term metrics, such as remaining life of the media. An adjustment to throttle levels/profiles can also be made at this time. An example time period for $T_{LL}$ could be 24 hours.

Figure 2:
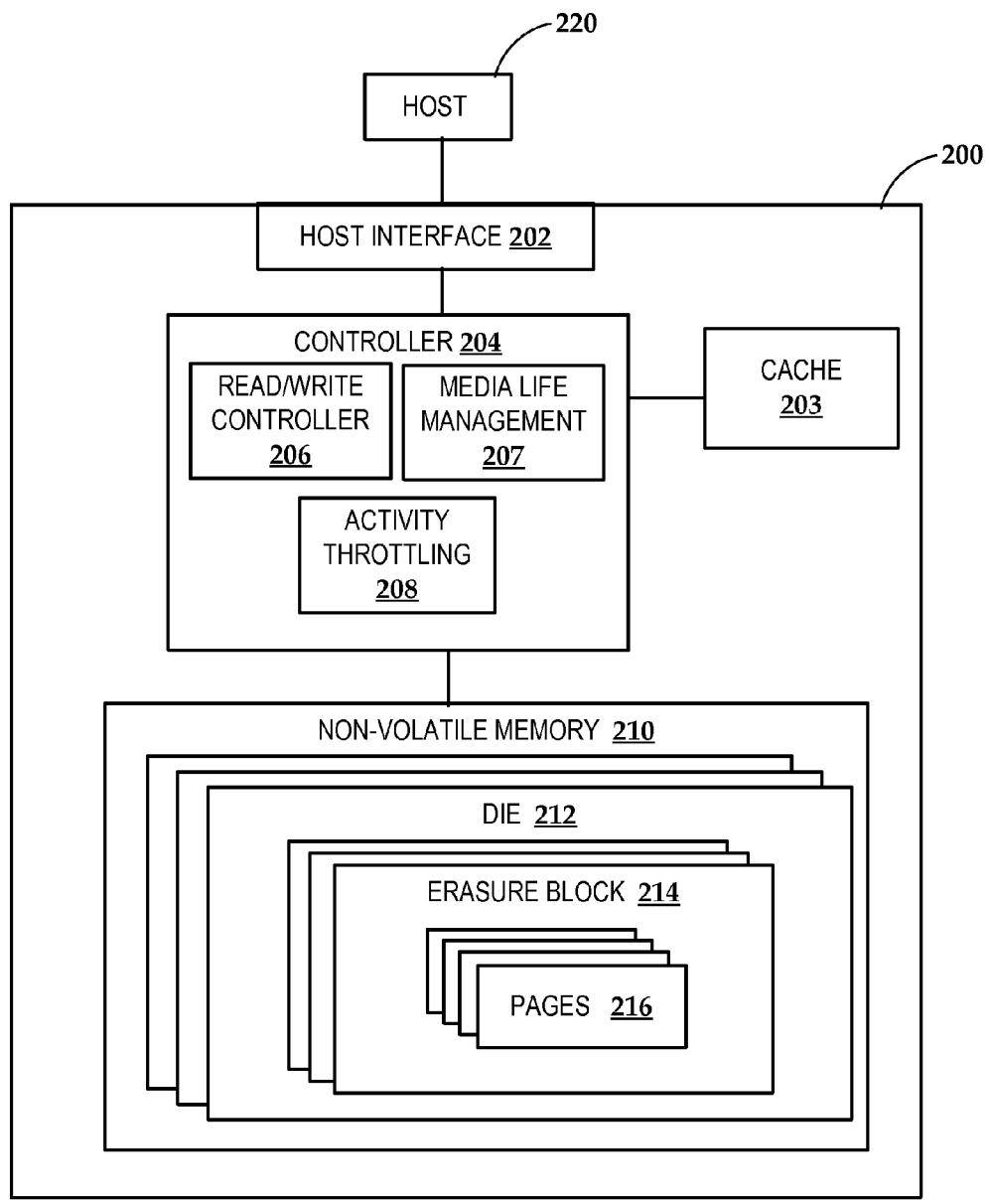
FIG. 2 is a block diagram illustrating an apparatus according to an example embodiment.

In reference now to FIG. 2, a block diagram illustrates an apparatus 200 according to an example embodiment. The apparatus 200 may be any type of persistent solid-state storage device, including a solid-state drive (SSD), thumb drive, memory card, embedded device storage, etc. The apparatus 200 may include a host interface 202 facilitates communications between the apparatus 200 and the host system 203, e.g., a computer. The apparatus 200 also includes media, here shown as solid-state, non-volatile memory 210. A host 220 can store data on the memory 210 and read data from the memory 210 via the host interface 202, which hides the operation of internal components of the apparatus 200 from the host 220.

The non-volatile memory 210 includes the circuitry and media used to persistently store both user data and other data managed internally by apparatus 200. The non-volatile memory 210 may include one or more flash dies 212, which individually contain a portion of the total storage capacity of the apparatus 200. The memory contained within individual dies 212 may be further partitioned into blocks, here annotated as erasure blocks/units 214. The erasure blocks 214 represent the smallest individually erasable portions of memory 210. The erasure blocks 214 in turn include a number of pages 216 that represent the smallest portion of data that can be individually programmed or read. In a NAND configuration, for example, the page sizes may range from 512 bytes to 4 kilobytes (KB), and the erasure block sizes may range from 16 KB to 512 KB. It will be appreciated that the present embodiments described herein are not limited to any particular size of the pages 216 and blocks 214, and may be equally applicable to smaller or larger data unit sizes.

The apparatus 200 includes one or more controllers 204, which may include general- or special-purpose processors that perform operations of the apparatus. The controller 204 may include any combination of microprocessors, digital signal processor (DSPs), application specific integrated circuits (ASICs), field programmable gate arrays (FPGAs), or other equivalent integrated or discrete logic circuitry suitable for performing the various functions described herein.

Functions that may be provided by the controller 204 include read/write operations, media life management, and write throttling, which are represented here respectively by functional modules 206-208. The modules 206-208 may be implemented using any combination of hardware, software, and firmware, and may cooperatively perform functions related to managing overprovisioned memory as described herein.

Read/write module 206 may perform operations related to mediating data storage operations between host interface 202 and media 110. These operations may include, selecting, buffering, verifying, and/or translating of data. For example, the read/write controller 206 may, either alone or with other modules, manage mapping between logical addresses used via the host interface 202 and physical addresses used via the media 210. The read/write controller 206 may also perform or direct operations that cause differences between the relative sizes of data transferred via the host interface 202 and to the media 210. These operations may include compression, caching (e.g., via cache 203) that may reduce the relative amount of data written to the media 210, and operations such as garbage collection that may increase the relative amount of data written to the media 210.

Generally, the media life management module 207 may track data such as PE cycles, temperatures, memory cell performance/errors, etc. This data may already be available and in use for operations such as wear-leveling, which ensures PE activity is spread evenly around the media 210 to prevent premature wear of some memory cells. The life management module 207 may also track data currently being written to, read from, and/or erased from the media 210 via read/write module 206. Based on any criteria described herein, the module may direct the throttling module 208 to cause a reduction in the amount of data written to, read from, and/or erased from the media 210.

The throttling module 208 may be a subcomponent of the read/write controller 206, or may be a separate functional module. In one embodiment, the throttling module 208 may selectably accept/block access to subcomponents of the memory 210, such as individual dies 212. The blocked and unblocked dies could be swapped/rotated on a regular basis to ensure that other processes (e.g., wear leveling, garbage collection) can operate as desired. The module 208 may use other techniques to throttle activities, such as disabling data busses, reverting to slower writing modes, pausing write requests, etc.

Internal high priority system information writes may be allowed to bypass this throttle. For example, writing a journal entry may not be required to adhere to the throttle. In addition, emergency data programs caused by unexpected power loss may bypass the program throttle. It should be further noted that this scheme need not penalize reads. When write transfers are being throttled, throttling need not occur for reads from the memory 210, which may occur at the full available data transfer rates. Non-overlapping read commands may be executed even if a limited number of dies 212 are actively enabled for programming while throttling occurs. Similarly if reads are being throttled, but writes have not met some threshold limit, then throttling of the read activity need not affect writes.

The apparatus 200 can track usage characteristics in conjunction with expected endurance values during the lifetime of the device. Based on the expected usage over a certain period of time, the data transfer to/from the memory 210 can be slowed to ensure the endurance meets a target specification, e.g., warranty lifetime. As described above, this throttling/slowing may involve artificially limiting the maximum number of flash die simultaneously performing operations. By restricting access at the media level, the host is indirectly throttled.

The functions described for apparatus 200 may be similarly applicable to other media types, such as hard disks. In such a case, the non-volatile memory 210 could instead by represented as one or more magnetic disks. While the underlying functionality of the controller 204 would be significantly different for an HDD as compared to an SSD, the general functions described above read/write controller 206, life management 207, and write throttling 208 may be analogous regardless of the underlying media. Throttling between the media 210 and the controller 204 in such a case may be performed in a manner appropriate to the media (e.g., increasing seek time, performing additional verification, etc.).

Figure 3:
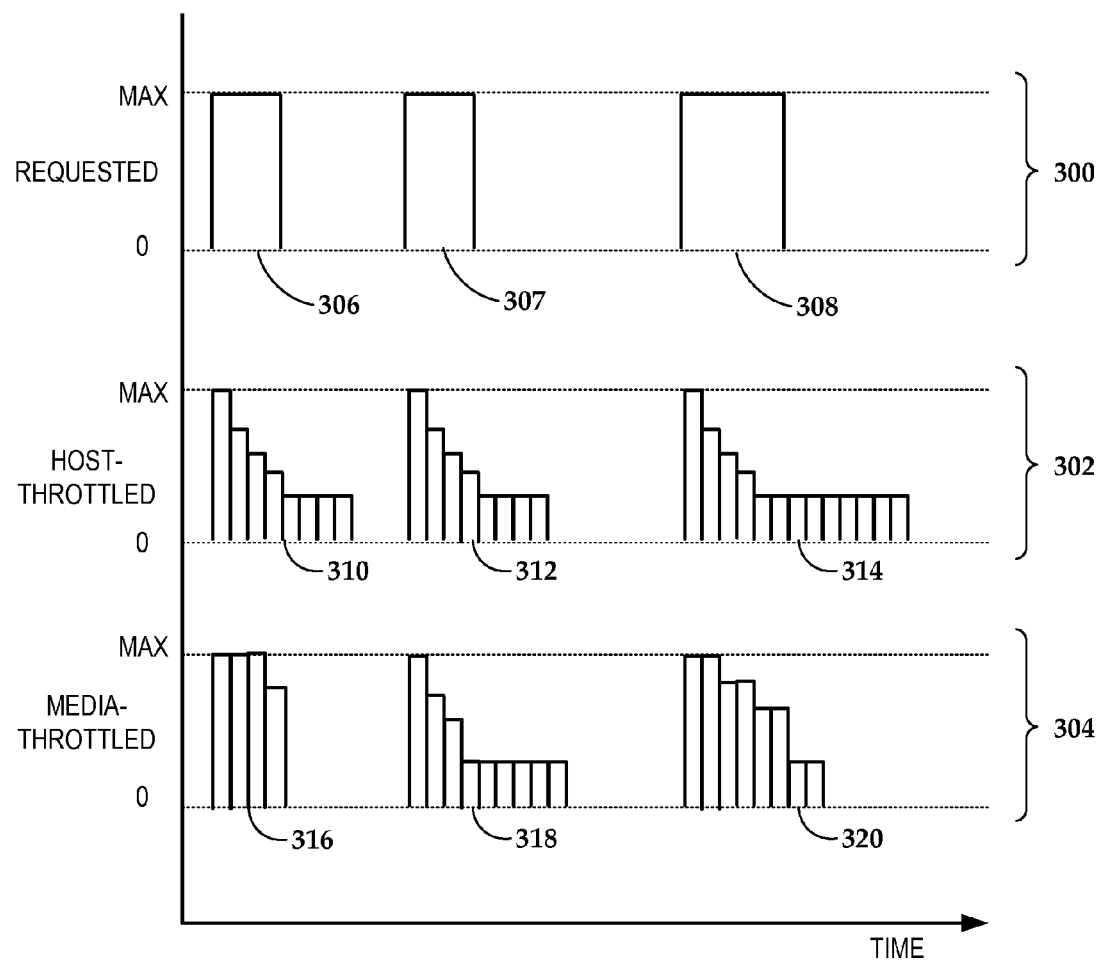
FIG. 3 is a graph comparing throughput for throttling using host and media throttling according to an example embodiment.

In FIG. 3, a graph illustrates an example of how throttling via the media may differ from a system that throttles writes (or other activities) from the host interface. The graph is intended to illustrate how a requested/attempted data transfer 300 from a host to a data storage device at maximum rate might be seen in a first case 302 where writes are throttled at the host interface, and in a second case 304 where the throttling occurs at the media. Curves 306-308 represent data transfer events, which may be considered continuous transfer of large blocks of data for purposes of this example. Also for purposes of this example, each of the transfers 306-308 may be assumed to take place under separate burst window counts. As such, the throttling mechanism allows for the host to "burst" at full data rates for first windows of time, subsequently reducing the rate if sustained write traffic continues during the remainder of that window. At the beginning of each new burst window count, the host may again burst at full data rates.

The area under the curves 306-308 represent the total size of the transfer, and it is assumed that the host can maintain the maximum rate if allowed to do so by host interface of the storage device. In both cases 302, 304, the data transfers are throttled to reduce impacts on media life. In case 302, only the host data rate is considered. In such a case, for events 306 and 307, which are approximately the same size, the performance of actual transfers 310, 312 from the host may be approximately the same.

However, although transfers 306, 307 may be the same size from the perspective of the host, the data within the transfers may be different as it is stored on the media. In this example, it is assumed that data in transfer 306 is substantially compressible, while transfer 307 is not. As a result, in the corresponding transfer profile 316 for case 304, there may only be a minor amount of throttling needed at the host, as the compression has the effect of lowering data rates as transferred to the media. It is also assumed that transfer 308 is substantially compressible (or some other factor is reducing the media data rate as compared to the host data rate), and so there would be an analogous difference in transfers 314 and 320.

In this example, it is assumed data of transfer 307 is not substantially compressible, and therefore profile 318 would be similar to the case 312 where only host data transfer is considered. In addition, it is assumed some write amplification occurs with this transfer, and this may cause some additional throttling as seen in profile 318 as compared to 312. It should be noted that write amplification is "behind the scenes" as far as the host is concerned, and so the areas under 307, 312, and 318 may all be the same (plus some differences to account for protocol overhead, metadata, etc.) if write amplification occurred or not. The write amplification could be considered a form of throttling, and so there may be little difference from the host perspective if either throttling mechanism 302, 304 was used during a programming operation where write amplification occurred. However, when accounting for wear and subsequent throttling, write amplification may be taken into account, and could affect subsequent performance to more accurately account for excessive wear caused by the write amplification.

In the embodiments described herein, the burst window can be determined by monitoring the incoming host write traffic and/or by using instantaneous wear information at the media. The wear information can be determined based on any combination of power-on time, PE cycles, error rates, etc. If host traffic is used for window calculations, then the write amplification (e.g., average, and/or cumulative over a given period) may also be used to calculate an estimate of the actual amount of data written to flash.

The burst window can be made to adjust to a given host traffic pattern dynamically. For example, there may be regular patterns of write activity that includes relatively large bursts of programming data followed by relatively long idle periods. Assuming the long-term programming activity (e.g., over periods of days or weeks) would not cause significant wear if substantially unthrottled, then the time period over which burst windows are defined can be adjusted to minimize throttling for those particular bursts. Any activity outside those windows that would cause undue wear could still be throttled as needed. Allowing for some adjustment based on predictable activity profiles may improve the perception of performance from the host perspective without significantly impacting life of the media.

When determining throttling levels, an algorithm can also take into account recent write history. For example, a "credit" could be given for relatively long periods of low activity, and this credit can allow removing some throttling up to a point. Any write traffic credit that is not used from a given window can be added to the total for the next window. The credit can accrue until the actual device wear is recalculated. At that time, the 'throttle level" may be adjusted, implicitly lowering the throttle amount (e.g., increasing potential write performance) for periods with large amounts of write credit.

Figure 4:
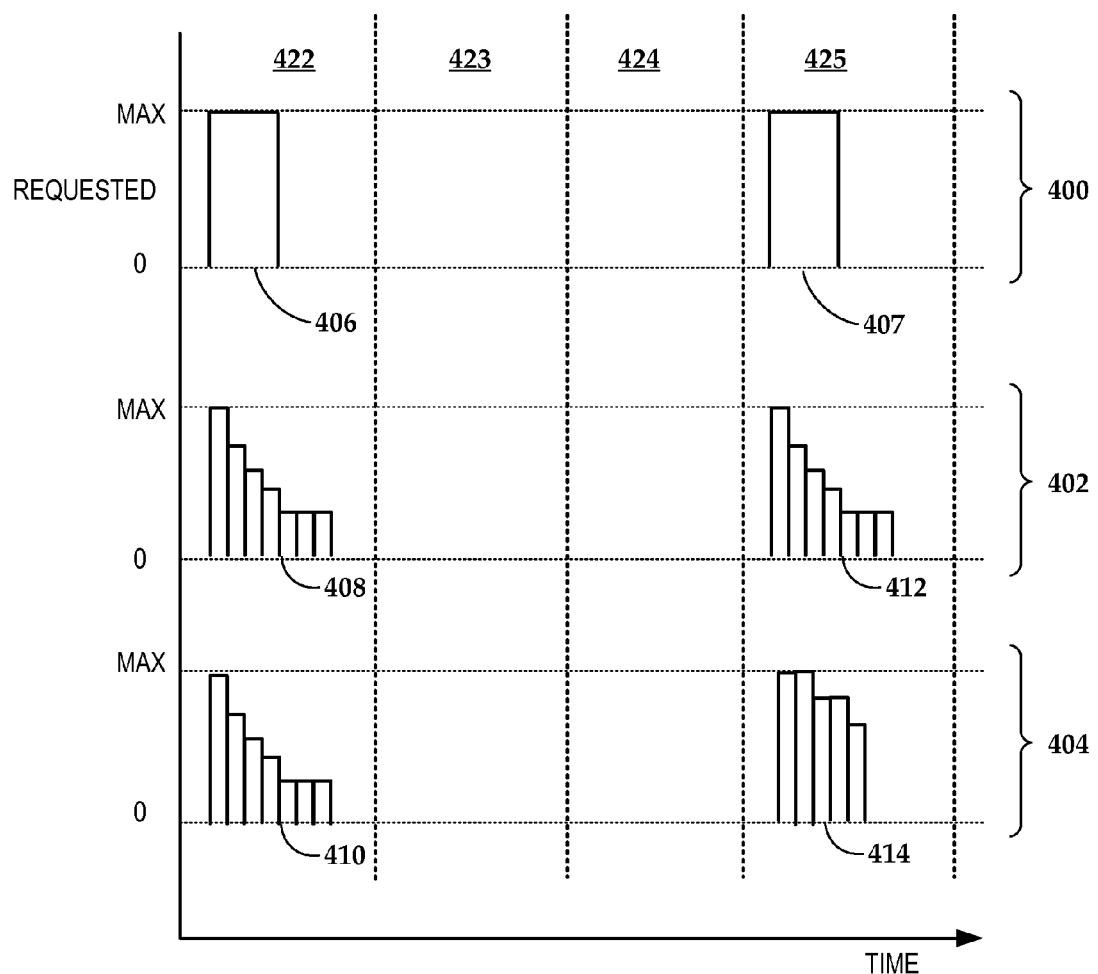
FIG. 4 is a graph comparing throughput for factoring in recent write history when throttling programming activity according to an example embodiment.

In FIG. 4, a graph illustrates how throttling may be affected according to example embodiments if credits from previous activity are considered. Similar to FIG. 3, attempted write activity 400 includes programming events 406, 407 that each occur in different ones of burst window counts 422-425. The actual data transfer at the host interface is shown for cases 402 and 404. In case 402, only the activity in the current window count 422-425 is considered. In case 404, activity from previous window counts is considered, and can increase or decrease throttling applied in a subsequent window count.

In the first window count 422, profiles 408, 410 are substantially similar for both cases 402, 404. In window count 425, profile 412 is also substantially similar to profile 408. This is because in case 402, each of the window counts 422, 425 are considered independently when determining throttling levels. However, in case 404, lack of significant programming activity in counts 423-424 has accumulated a credit for count 425. As a result, profile 414 exhibits less throttling than window 412. For many use cases, this may make throttling less noticeable, while still helping to ensure the media meets its target endurance.

The write throttling described herein can be performed in a number of ways. For example, where the media is flash memory or some other non-volatile, solid-state memory, throttling can be obtained by limiting the number of simultaneously active dies (or some other divisions of memory) that are made available for programming. The amount of throttling can be adjusted by adjusting the count of dies available for programming. For example, each "step" in the throttle level represents an increment to the maximum number of simultaneously active die performing program operations. While each step need not be a 1:1 mapping to active die (e.g., step 1=one active die, step 2=two active dies, etc.) the steps can be made to scale linearly.

Figure 5:
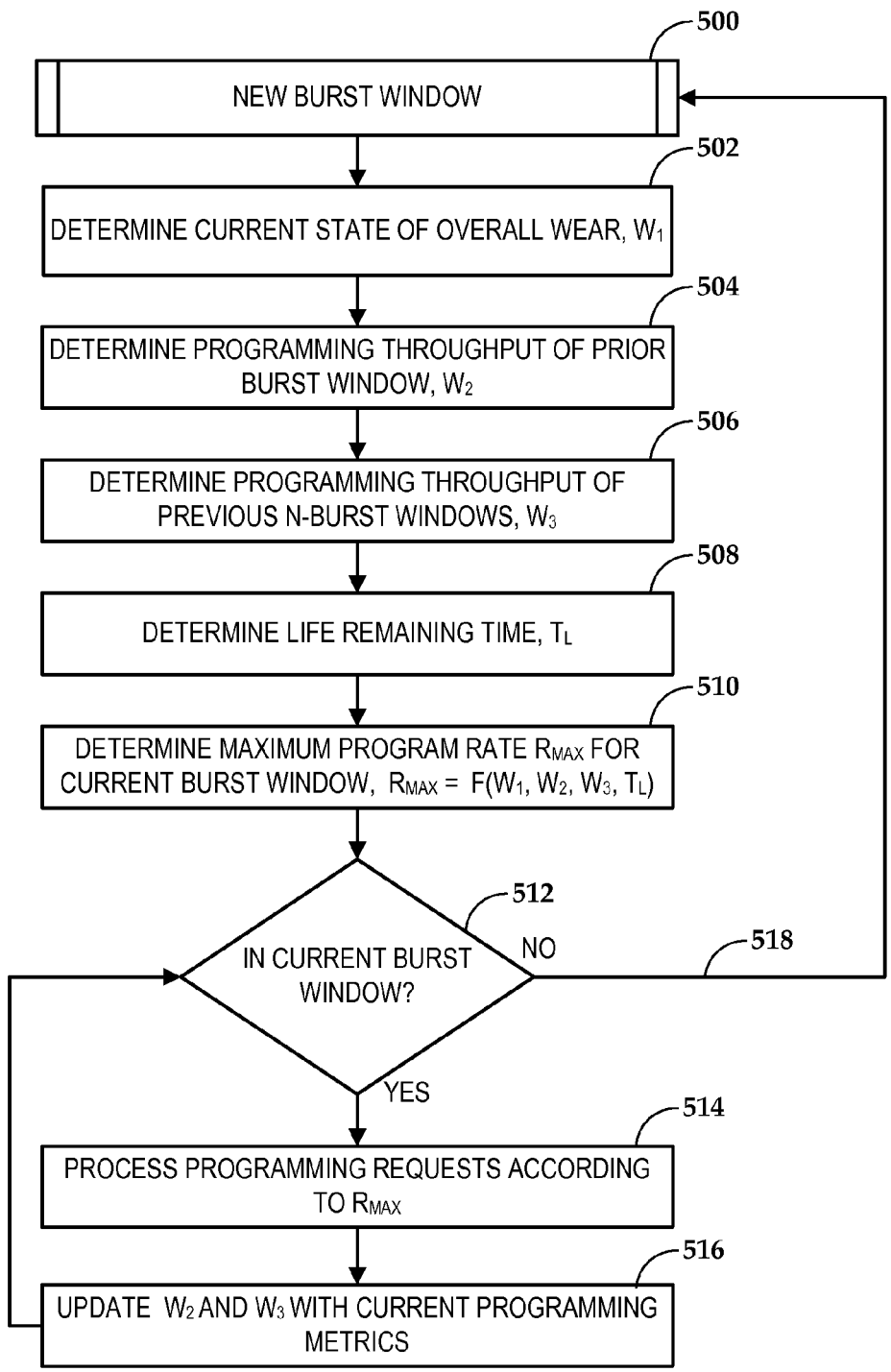
FIG. 5 is a flowchart illustrating the calculation of burst window metrics according to an example embodiment.

In reference now to FIG. 5, a flowchart illustrates a routine 500 for throttling according to an example embodiment. The algorithm may be entered 500 based on a timer or other event that indicates a new burst window. As described above regarding, e.g., FIG. 1B, a new throttling level may be recalculated for each new burst window $T_{BW}$. To determine which throttle level to choose, the algorithm determines 502 the current actual wear level $W_1$ of the device. The value of $W_1$ may be fixed for some number of burst windows, such that this determination may involve reading the value from memory.

This determination 502 may also include determining that the device is within some initial period during which no throttling is applied, e.g., below some time and/or wear threshold, or "pre-wear allowance." In order to facilitate reduced factory operations (e.g., testing, burn-in) and/or end user installation times, a pre-wear allowance can be specified. This allowance is the amount that the drive is allowed to wear before throttle activities begin. Once this wear level is reached, the throttle mechanisms begin monitoring and enforcing write performance. This allowance may be specified as a percentage of wear, or a fixed time period, or a combination of both.

Another determination 504 that may be performed in this procedure 300 involves determining the activity of the immediately preceding burst window. This may be able to account for short-term effects (e.g., thermal) that may have a known impact on wear that can be diminished by relatively short periods of throttling. Other wear factors may require looking at a longer time period, which is indicated by determination 506 which may look at similar metrics as determination 504, but over a number of previous burst windows. Either of these determinations 504, 506 can be used to track "credits" and "debits" of write throughput for purposes of the making throttling adjustments to the current window. While these determinations 504, 506, may be related to wear, they may use different criteria than the determination of overall wear at 502.

The determinations 504, 506 may be made based on rates of actual data programmed to the media, as opposed to host data transfer rates. The former may account for such factors as write amplification and data compression. These determination 504, 506 may also take into account other factors of the requests, such as large versus small requests, current or historical nature of the access (e.g., whether certain blocks of data are being continually accessed/changed), etc. For example, knowing how big a request is may help select an optimum amount of throttling before and/or during the time the request is being processed.

At operation 508, a remaining life is determined. This life determination 508 could be independent of wear, e.g., based on time remaining on warranty period, power-on time, etc. Based on the values determined at 502, 504, 506, and 508, a throttling value for the current burst window can be determined 510. Thereafter, while in the current burst window 512, programming requests may be processed 514 according to the throttling rate determined at 510. This processing 514 may involve throttling all programming requests regardless of the rate, or only applying throttling if the requests approach or meet the maximum rate allowed, $R_{MAX}$. This may also involve updating 516 metrics of both short term and long term windows. When the current window has completed (e.g., based on elapsed time), then metrics can be recalculated, as indicated by path 518.

A similar procedure as shown in FIG. 5 can be applied to burst window counts $C_{BW}$, which include a predetermined number of burst windows. During these procedures, the device can readjust metrics such as overall wear $W_L$ and remaining life $T_L$ determined at operations 502 and 508. Other adjustments could be made that affect the procedure 500, such as adjusting the duration of the burst window and the number of burst windows to be included in $C_{BW}$.

As should be apparent from the above, there are at least two measures of device life that can be considered when deciding how much, if any, throttling to be applied. The first measure is component life as measured by time in service. This has been described as being, for example, related to warranty periods, although there are other criteria, such as obsolescence, geometric growth of storage requirements, etc., may also be used to set expectations about what a reasonable service life might be for a particular device. The other measure of life is based on usage patterns that cause physical/electrical wear to the media. By considering both of these aspects, a balance can be maintained between write throttling and measures taken to extend life of the product. Throttling may improve device life but may impact user perceptions of the device's performance. As a result, the device may analyze both the actual wear incurred on the device and the expected lifespan, and adjust throttling accordingly.

Figure 6A:
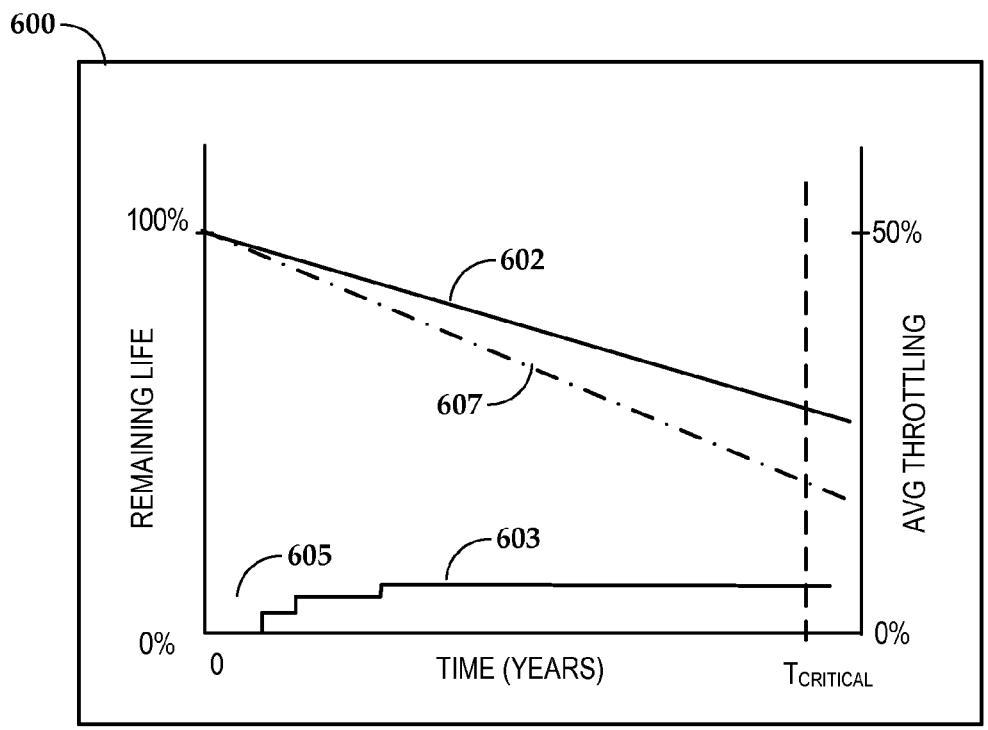
FIGS. 6A and 6B. illustrate the application of throttling based on product age and estimated wear according to an example embodiment.
Figure 6B:
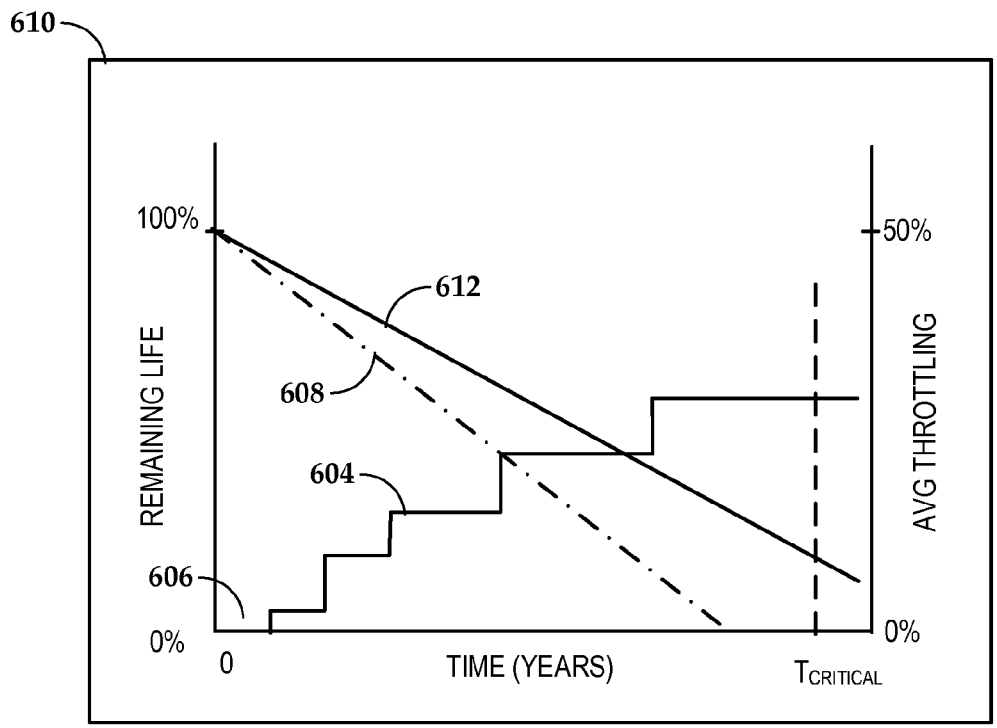

An example of a wear-adaptive throttling scheme according to one embodiment is shown by way of graphs 600 and 610 in FIGS. 6A and 6B. Both these graphs 600, 610 illustrate wear curves 602, 612 as a function of time of two similar devices under different use conditions. A target time, $T_{CRITICAL}$ represents an expected life of the device, which may represent a time when some statistical confidence interval of device reach a certain wear level (e.g., 0% life, 10% life). These life measurement 602, 612 may be determined using PE cycles and/or any other measure related to physical/electrical wear of the media.

Wear curve 602 represents a light-use case, in which around 50% of the life is still remaining at $T_{CRITICAL}$. Wear curve 612 represents a higher level of use, in which around 15% of life is remaining at $T_{CRITICAL}$. Curves 603 and 604 represents an amount of wear-dependent write throttling applied to the respective devices over the illustrated time periods. Regions 605, 606 represent pre-wear allowance periods, during which no throttling occurs. Although the curves 603, 604 show similar initial amounts of throttling after the pre-wear periods 605, 606, the amount of throttling shown by curve 604 increases much more than curve 603 because of the higher level of use shown in FIG. 6B. Because the devices are tracking both actual wear and the time-in-service, the device in FIG. 6A may ultimately decide that no further increase in throttling is needed because extrapolation of curve 602 may indicate the device will last significantly longer than $T_{CRITICAL}$. The curve 603 remains constant at this point, although in some configurations it may decrease in value, even down to 0% throttling.

In FIGS. 6A and 6B, curves 607 and 608 represent anticipated product life if no throttling was applied. As curve 608 indicates, throttling is needed in this case to ensure adequate product life. While curve 607 indicates the product would have achieved target life without throttling, the adaptive nature represented by curve 603 helps ensure minimal impact on performance. While these graphs are general in nature and do necessarily reflect real-world throttling performance, they do illustrate how both predicted life and actual use may be considered when applying throttling.

Although the illustrated throttling mechanisms may be automatically enabled and adjusted, there may be situations where an end-user may want to perform this adjustment manually. For example, in an application where time is of the essence (e.g., video editing) an increase in throughput may be worth an ultimately shorter lifespan. In other cases, (e.g., an enterprise server) a more predictable life expectancy may be more important than instantaneous throughput for write operations.

Figure 7:
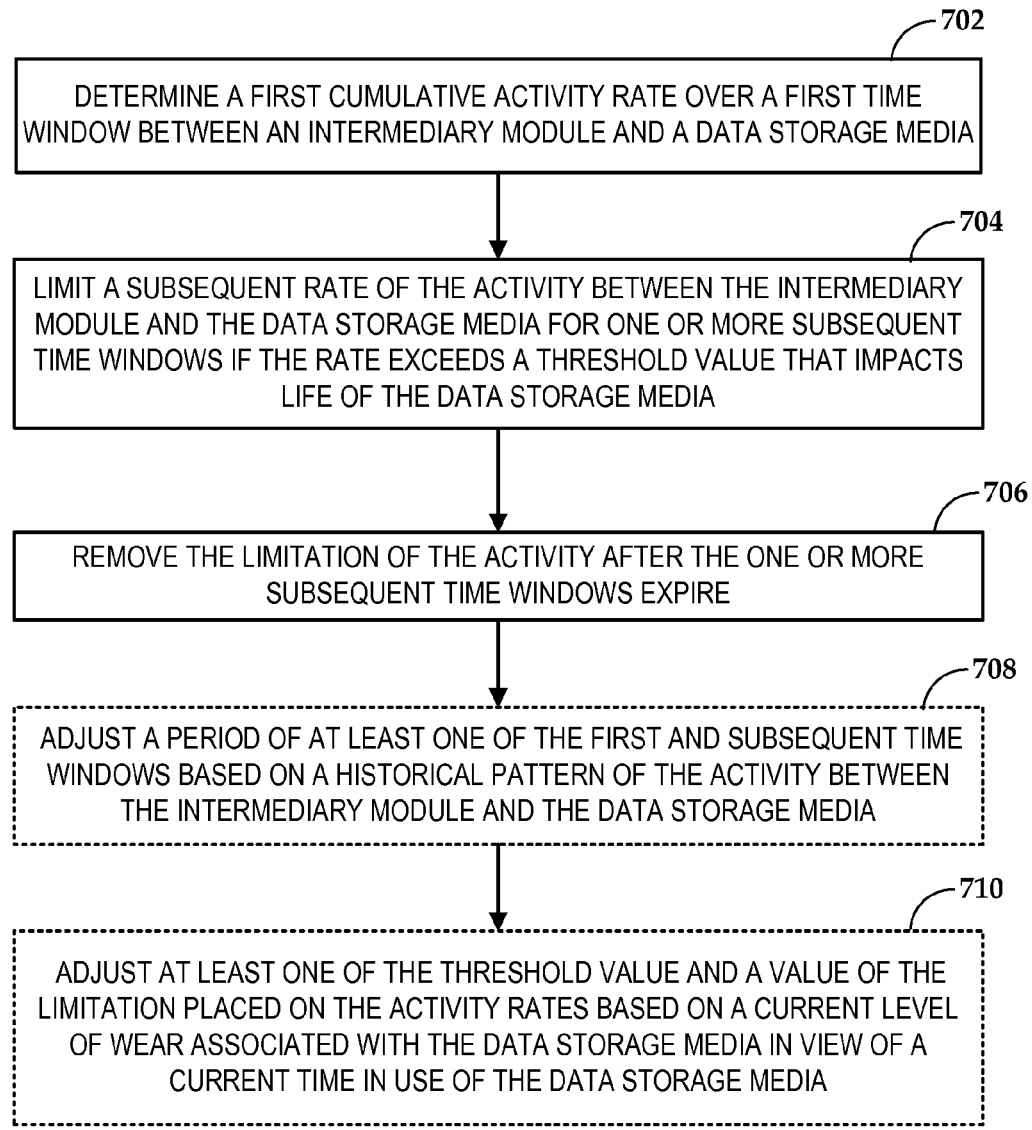
FIG. 7 is a flowchart illustrating a procedure according to an example embodiment.

In reference now to FIG. 7, a flowchart illustrates a procedure according to an example embodiment. A first cumulative activity rate (e.g., rate of writes, reads, and/or erasures) is determined 702 over a first time window between an intermediary module and a data storage media. The intermediary module is coupled between a host interface and the data storage media. The data storage media may include a solid-state, non-volatile memory. A rate of the activity between the intermediary module and the data storage media is limited 704 for one or more subsequent time windows if the first cumulative data transfer rate exceeds a threshold value that impacts life of the data storage media. If one of a predetermined wear level threshold and a predetermined time in use is not yet reached, the data transfer rate may not be limited if the cumulative data transfer exceeds the threshold value. This may allow, for example, factory testing (e.g., burn-in) and other initial activities (e.g., setup and installation of software on target host device) to be performed without the media being throttled. If the media includes an non-volatile, solid-state memory, limiting 704 the activity rate may involve limiting a number of memory dies of the solid-state, non-volatile memory that may be simultaneously accessed.

After the one or more subsequent time windows expire, the limitation of the data transfer rate can be removed 706. The procedure may optionally involve adjusting 708 a period of at least one of the first and subsequent time windows based on a historical pattern of write activity between the intermediary module and the data storage media. The procedure may also optionally involve adjusting 710 at least one of the threshold value and a value of the limitation placed on the data transfer rates based on a current level of wear associated with the data storage media in view of a current time in use of the data storage media. This adjustment 710 can, e.g., ensure the estimated wear is commensurate with what is expected given the current age of the device. In this procedure, data transfer rates from the intermediary module to the data storage media may differ from data transfer rates from the host interface to the intermediary module based on at least one of write amplification, compressibility of the data, random/sequential nature of the data transfer random versus sequential, large versus small requests, current or historical nature of the access (e.g., whether certain blocks of data are being continually accessed/changed), etc. For example, knowing how big a request is may help select an optimum amount of throttling beforehand.

It will be understood that the procedures shown in FIGS. 5 and 7 need not be limited by the order in which the various operations are presented. The illustrated operations may be performed in parallel, and some operations may be performed more frequently than others. For example, the adjustment 710 may be performed less frequently than others of the operations 702, 704, 706, 708. Similarly, while procedure 500 describes limiting program rates for a media, the procedure may be equally applied to any activity, such as reading, erasures, and any combination thereof.

The various embodiments described above may be implemented using circuitry and/or software modules that interact to provide particular results. One of skill in the computing arts can readily implement such described functionality, either at a modular level or as a whole, using knowledge generally known in the art. The structures and procedures shown above are only a representative example of embodiments that can be used to increase life of data storage devices as described above.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
determining a first cumulative rate of input/output operations over a first time window between an intermediary module and a solid-state, non-volatile memory, wherein the intermediary module is coupled between a host interface and the solid-state, non-volatile memory;
limiting a number of memory dies of the solid-state, non-volatile memory that may be simultaneously accessed to limit a subsequent rate of the input/output operations between the intermediary module and the solid-state, non-volatile memory for one or more subsequent time windows if the first cumulative rate exceeds a threshold value that impacts life of the solid-state, non-volatile memory; and
removing the limitation of the subsequent rate after the one or more subsequent time windows expire.

2. The method of claim 1, further comprising adjusting a period of at least one of the first and subsequent time windows based on a historical pattern of activity between the intermediary module and the solid-state, non-volatile memory.

3. The method of claim 1, wherein input/output rates between the intermediary module and the solid-state, non-volatile memory differ from input/output rates between the host interface and the intermediary module based on at least one of write amplification, compressibility of the data, random/sequential nature of the input/output, data size associated with the input/output, and historical patterns associated with the input/output.

4. The method of claim 1, further comprising adjusting at least one of the threshold value and a value of the limitation placed on the subsequent rates based on a current level of wear associated with the solid-state, non-volatile memory and further in view of a current time in use of the solid-state, non-volatile memory.

5. The method of claim 1, wherein, if one of a predetermined wear level threshold and a predetermined time in use is not yet reached, the subsequent rate is not limited if the first cumulative rate exceeds the threshold value.

6. The method of claim 1, wherein the first cumulative rate of the input/output operations comprises a system-dependent, maximum, data transfer rate of the solid-state, non-volatile memory.

7. The method of claim 1, wherein the input/output operations comprise a weighted combination of input/output operations per second of at least two of read, write, and erase operations.

8. An apparatus comprising:
an intermediary module coupled between a host interface and a solid-state, non-volatile memory; and
at least one controller that causes the apparatus to:
determine a cumulative rate of input/output operations between the intermediary module and the solid-state, non-volatile memory over a first time window;
limit a number of memory dies of the solid-state, non-volatile memory that may be simultaneously accessed to limit a subsequent rate of the input/output operations between the intermediary module and the solid-state, non-volatile memory for one or more subsequent time windows if the cumulative rate exceeds a threshold value that impacts life of the solid-state, non-volatile memory; and
remove the limitation of the subsequent rate after the one or more subsequent time windows expire.

9. The apparatus of claim 8, wherein the controller further causes the apparatus to adjust at least one of the first and second time periods based on a historical pattern of activity between the intermediary module and the solid-state, non-volatile memory.

10. The apparatus of claim 8, wherein activity rates between the intermediary module and the solid-state, non-volatile memory differ from activity rates between the host interface and the intermediary module based on at least one of write amplification, compressibility of the data, and random/sequential nature of the data transfer.

11. The apparatus of claim 8, wherein the controller further causes the apparatus to adjust at least one of the threshold value and a value of the limitation placed on the subsequent rates based on a current level of wear associated with the solid-state, non-volatile memory in view of a current time in use of the data storage media.

12. The apparatus of claim 8, wherein, if one of a predetermined wear level threshold and a predetermined time in use is not yet reached, the subsequent rate is not limited if the cumulative rate of the input/output operations exceeds the threshold value.

13. The apparatus of claim 8, wherein the cumulative rate of the input/output operations comprises a system-dependent, maximum, data transfer rate of the solid-state, non-volatile memory.

14. The apparatus of claim 8, wherein the input/output operations comprise a weighted combination of input/output operations per second of at least two of read, write, and erase operations.

* * * * *